US005368671A

United States Patent [19]

Sashihara et al.

[11] Patent Number: 5,368,671

[45] Date of Patent: Nov. 29, 1994

[54] PAPER TUBE FOR PHOTOSENSITIVE MATERIALS

[75] Inventors: Kenji Sashihara; Shigeru Minato, both of Kanagawa, Japan

[73] Assignee: Fuji Photo Film Co., Ltd., Miami-Ashigara, Japan

[21] Appl. No.: 61,226

[22] Filed: May 17, 1993

[30] Foreign Application Priority Data

May 15, 1992 [JP] Japan .................................. 4-123591

[51] Int. Cl.[5] .............................................. B32B 31/00

[52] U.S. Cl. ....................................... 156/195; 138/91; 138/109; 138/144; 156/191; 206/416; 493/276; 524/503; 525/57

[58] Field of Search ................ 156/191, 195; 524/503; 525/57; 493/276; 138/91, 144, 109; 206/416

[56] References Cited

U.S. PATENT DOCUMENTS

| | | | |
|---|---|---|---|
| 3,430,543 | 3/1969 | Cunningham | 156/195 |
| 4,733,777 | 3/1988 | Van Geyte et al. | 206/416 |
| 4,877,133 | 10/1989 | Klenter et al. | 206/416 |

FOREIGN PATENT DOCUMENTS

| | | | |
|---|---|---|---|
| 50-30973 | 3/1975 | Japan | 156/191 |
| 58-24435 | 2/1983 | Japan | 493/276 |

*Primary Examiner*—John J. Gallagher

*Attorney, Agent, or Firm*—Burns, Doane, Swecker & Mathis

[57] ABSTRACT

A paper tube consisting essentially of one or a plurality of paper tapes formed into a tube and a blend adhesive comprising two or more aqueous adhesives different in their concentrations adhering the paper tapes, its production and a package using it. In the paper tube, the adhesive can be coated into a thin film layer even at a high concentration without reducing the initial adhesive force, and the drying process after the coating can be omitted.

8 Claims, 5 Drawing Sheets

PAPER TUBE FOR PHOTOSENSITIVE MATERIALS

BACKGROUND OF THE INVENTION

This invention relates to a paper tube used as a paper core for a roll of a photosensitive material, its production, and a package of a roll of a photosensitive material using it.

Photographic properties photosensitive materials, such as photographic films, are degraded if the materials are stored by under high humidity conditions (relative humidity: more than 80 %). Accordingly, in the case of paper tubes for photosensitive materials using an aqueous adhesive, it was necessary to dry the paper tube after winding the paper tape. In order to omit the drying process, it was necessary to apply a high concentration adhesive in a thin thickness, as well as to decrease moisture content of the paper tape. However, since the paper tape becomes fragile by decreasing the moisture content, a moisture content of more than 5% is necessary in the paper tape for putting it to practical use as the paper core. Moreover, when the concentration of adhesive is increased, providing a thin film coating of the adhesive is difficult due to a high viscosity. For example, a viscosity range suitable for providing a thin film coating, yet capable of providing a coating of adhesive with rare occurrences of streaks and unevenness by a roll coater is 1,000 to 10,000 (mPa·s) at 20° C. by a Brookfield viscometer. When the concentration of an adhesive having a concentration of 45% and a viscosity of 6,000 is elevated to 50%, the viscosity becomes 30,000 which is outside the range, suitable for providing a thin film coating. The viscosity can be reduced by decreasing the viscosity of polyvinyl alcohol (PVA). However, when the viscosity of PVA was decreased, the initial adhesive force was decreased resulting in a loss of tube-forming ability. Thus, in the case of forming a paper core using an aqueous adhesive, it was difficult to omit the drying process.

As a method of omitting the drying process, Japanese Patent KOKOKU No. 58-48342 discloses a method of winding a film resin together with paper tape and adhering the paper tape by heating to melt the resin. The method requires heating at every winding which is troublesome in workability, and accordingly, the method is unsuitable for the production of multilayer paper, tubes as cores.

SUMMARY OF THE INVENTION

An object of the invention is to provide a paper tube formed by using an adhesive effective to provide a thin film layer even at high concentrations without reducing initial adhesive force, yet does not require the drying process, its production, and a package of a roll of a photosensitive material using it.

The inventors investigated in order to achieve the above object, and found that, when separately prepared adhesives different in concentration are blended, the viscosity of the blend becomes lower than a single adhesive having a concentration of 55% and a viscosity of 18,000 was blended with an adhesive having a concentration of 45% and a viscosity of 6,000 at a ratio of 1:1, the viscosity of the blend was less than 10,000.

The present invention has been completed based upon the above finding, and provides a paper tube consisting essentially of one or a plurality of paper tapes formed into a tube and a blend adhesive comprising two or more aqueous adhesives different in their concentrations adhering the paper tapes, its production and a package of a photographic photosensitive material using it.

Figure 1:
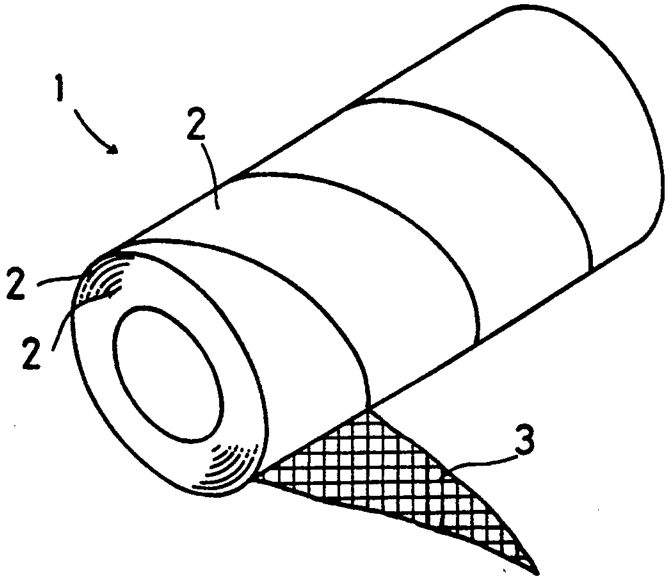
FIG.1 is a perspective view of a paper tube partially unfolded which embodies the invention.

1 . . . Paper tube
2 . . . Paper tape
3 . . . Blend adhesive
11 . . . Mandrel
12 . . . Adhesive coating portion
13 . . . Lubricant coating portion
14 . . . Paper tape
20,30,40 . . . Package of a roll of a photosensitive material
21,33,42 . . . Photosensitive material
23 . . . End cap

DETAILED DESCRIPTION OF THE INVENTION

The aqueous adhesives suitable for the invention are vinyl acetate polymer emulsion, aqueous glue, water glass and the like, and vinyl acetate polymer emulsion is preferable in view of handling.

Vinyl acetate polymer emulsion can be prepared by the emulsion polymerization of vinyl acetate alone or in the coexistence of a small amount of other copolymerizable vinyl monomer through a known method. As the copolymerizable vinyl monomer, there are ethylene, styrene, acrylic acid, methacrylic acid, crotonic acid, malic acid, their esters, and the like. Polyvinyl alcohol (PVA) or the like is used as protective colloids, and a suitable blending amount is 2 to 20 wt. %, preferably 3 to 15 wt. %, of the solid matter of vinyl acetate polymer. The protective colloids may be added at the initiation of emulsion polymerization, during midway or after the termination thereof, and usually are added at the initiation or during midway. The polymerization catalyst may be an arbitrary peroxide, such as aqueous hydrogen peroxide, potassium persulfate or the like. In addition, an arbitrary compound, such as various surfactant, other water-soluble protective colloids, pH adjustor or the like may be blended.

The vinyl acetate polymer emulsion thus prepared is used as it is, or is optionally blended with plasticizer film-forming assistant, such as high boiling point solvent, extender pigment, such as clay, calcium carbonate and kaolin, color pigment, such as titanium dioxide, antiseptic, insecticide, viscosity enhancer or the like. Moreover, it is also to combine a hardening agent, such as metal salt, glyoxal or boric acid.

Figure 10:
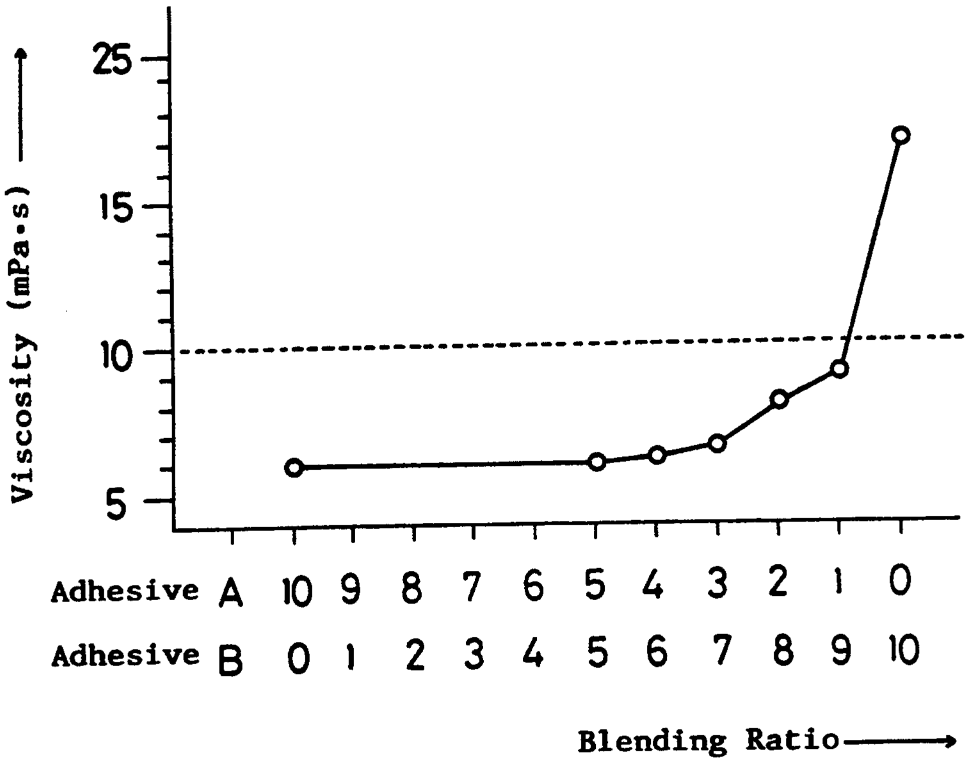
FIG. 10 is a graph indicating a relationship between the blending ratio of a vinyl acetate adhesive A to another vinyl acetate adhesive B and the viscosity of the blend adhesive.

The concentration of each aqueous adhesive and the blending ratio are adjusted so that the viscosity of the blend adhesive becomes finally less than about 10,000. A relation between the blending ratio of a vinyl acetate adhesive A having a viscosity 18,000 mPa·s and a concentration of 55% to a vinyl acetate adhesive B having a viscosity 6,000 mPa·s and a concentration of 45% and the viscosity of the blend adhesive is shown in FIG. 10. In the figure, the region under the broken line (viscosity: 10,000) indicates the range exercising a good coating ability. The above viscosity was measured by a Brookfield viscometer at 20° C. at 6 rpm using a rotor 3.

The raw paper used as the paper tape for forming the paper tube of the invention may be anyone not affecting adversely photosensitive materials to be wound. Suitable pulps for forming the raw paper include chemical pulps, such as sulfite pulp (SP) and kraft pulp (KP), semichemical pulp, such as chemithermomechanical pulp (CTMP) and chemigroundwood pulp (CGP) and mechanical pulp. Moreover, crushed news papers, crushed corrugated board and the like can also be used. Preferable raw papers are a less generation of sulfur compounds, formalin and the like, such as the neutral paper disclosed in EP 0 436 133 A1. The raw papers may be combined. A suitable thickness of the raw paper is 0.2 to 1.0 mm, and a suitable areal weight is 150 to 750 $g/m^2$.

In order to prevent the fouling of surface and the peeling from a cut end, it is preferable to wind a decorative paper as the uppermost layer. A suitable thickness of the decorative paper is 0.05 to 0.2 mm. The size of the paper tube is designed according to its use. For example, in the case of the core used for photosensitive materials for computerized type-setting system, in general, the inside diameter is 18 to 153.2 mm, and the outside diameter is 21 to 165.2 mm. In the case of the core used for photosensitive materials for printing, in general, the inside diameter is 50.7 to 78 mm, and the outside diameter is 56.7 to 89 mm. In the case of the core used for photosensitive materials for color paper, in general, the inside diameter is 75.2 to 77.2 mm, and the outside diameter is 83.2 to 87.2 mm.

The paper tube of the invention can be used for various uses, such as the core of a magazine for containing a photographic photosensitive material disclosed in Japanese Patent KOKAI No. 61-219040.

In the case of using as the core of a magazine for containing a photographic photosensitive material, means usable as the bearing for the core are the fixed cylinder made of paper material disclosed in Japanese Patent KOKAI No. 61-209040, the bearing formed by the pulp molding disclosed in Japanese Patent KOKAI No. 62-248434, the bearing formed by injection molding plastic material, and the like. In the case of the fixed cylinder made of paper material, to fix the cylinder accurately is difficult and troublesome. However, the bearings formed by the pulp molding and the injection molding are preferable because a structural body can be constructed in a high dimentional accuracy. The bearing formed by the pulp molding is more preferable because of having a more excellent discarding ability. The pulp molding can be divided into the vacuum molding and the press molding. The vacuum molding is utilized for relatively weak articles, such as egg tray, and comprises putting up a wire gauze on a mold provided with many holes, immersing the mold into a pulp slurry, sucking to adhere pulp fibers onto the outside of the wire gauze of the mold, releasing the fiber from the mold, and then drying. The press molding is utilized for relatively strong articles, and comprises pouring a pulp slurry into a frame, and pressing to dehydrate the pulp fiber by a female mold provided with many holes and put up a wire gauze to mold a molded article.

Preferable bearings have a good discarding ability, an uniform thickness, a high dimentional accuracy, a relatively high strength, no generation of wastes and inexpensiveness. Suitable raw materials for forming a bearing which satisfies the above conditions by the pulp molding are imported and home-produced crushed corrugated board, virgin pulp, deinked crushed news papers and neutral high yield pulp in view of photographic properties, but wood-free papers, magazine stock and coated paper are unsuitable because of containing ink or fluorescent agent. In view of strength, it is preferable to contain crushed corrugated board, neutral high yield pulp, hardwood bleached kraft pulp (LBKP), softwood unbleached kraft pulp (NUKP), softwood bleached kraft pulp (NBKP) or softwood bleached sulfite pulp in an amount of more than 50%, but crushed news papers, magazine and crushed wood-free paper are unpreferable.

As the roll of a photosensitive material, there are a roll of photographic printing paper, a roll of microfilm, a roll of photosensitive resin film, a roll of heat-sensitive film, a roll of printing paper for computerized type-setting system, a roll of microfilm for computer, a roll of lithfilm, a roll of auto posi printing paper, a roll of photographic film for phototype setting, a roll of diazonium printing paper and the like.

According to the invention, an adhesive having a high concentration can be coated into a thin film layer, and photographic properties of photosensitive materials are not adversely affected.

EXAMPLES

The paper tube 1 for photosensitive materials of FIG. 1 was formed of a plurality of paper tapes 2,2, . . . ,2 wound into spiral to form a cylinder, and each paper tape 2 was adhered through a blend adhesive 3. The blend adhesive 3 was prepared by blending two kinds of aqueous adhesives different at least in their concentration.

Figure 2:
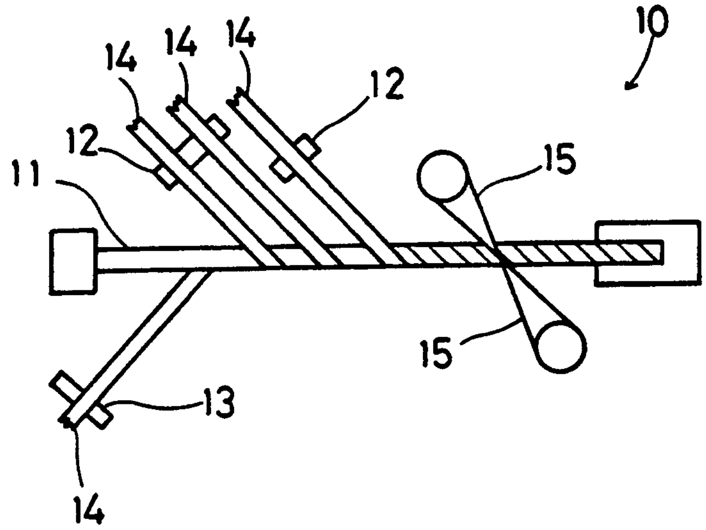
FIG. 2 is a schematic view of a spiral winding machine for forming a paper tube for photosensitive materials embodying the invention.

The above paper tube 1 was formed by a spiral winding machine (common name, a Langstone type) shown in FIG. 2. The spiral winding machine 10 was provided with a mandrel 11, a lubricant-coating means 13 and a plurality of adhesive-coating means 12 for coating the blend adhesive 3 around the mandrel 11. A sliding belt 15 for sliding to deliver the wound paper tape 14 was provided on the downstream side of the mandrel 11. In the above apparatus, the underside of the paper tape 14 forming the lowermost layer of the paper tube was coated with lubricant by the lubricant-coating means 13 and wound in spiral on the mandrel 11 by its rotation. Subsequently, the underside of each paper tape 14 forming the second layer to the uppermost layer was coated with the blend adhesive, and then wound in spiral on the mandrel 11 and adhered successively. The paper tube thus formed on the mandrel 11 was delivered by the sliding belt 15, and discharged from the mandrel 11.

Figure 3:
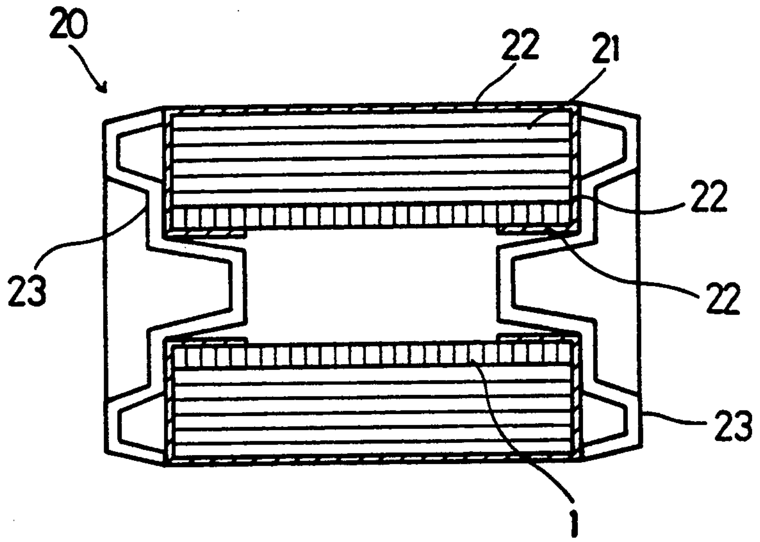
FIG. 3 is a sectional view of a package of a roll of a photosensitive material which embodies the invention.
Figure 4:
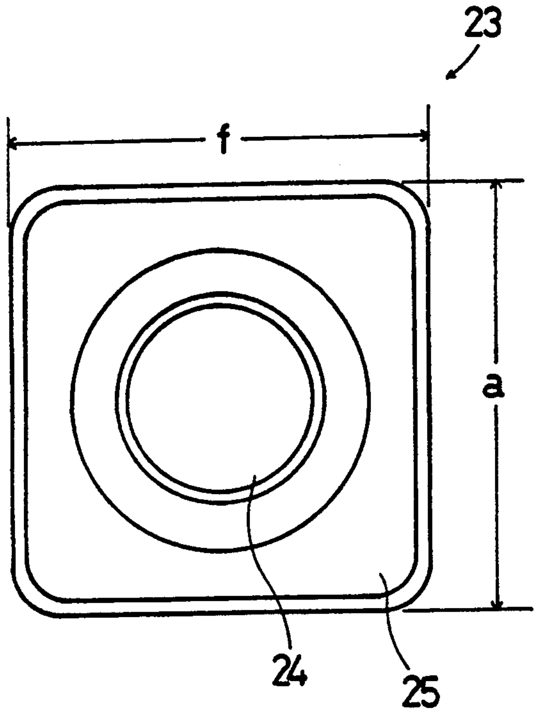
FIG. 4 is a front view of an end cap member composing the package.
Figure 5:
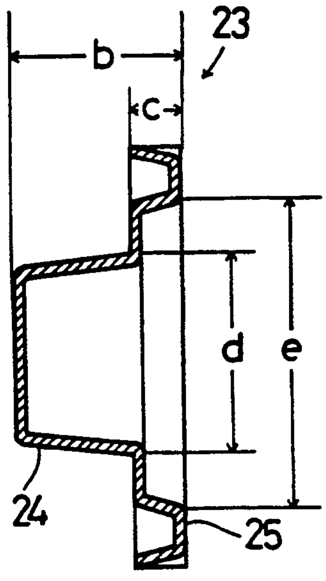
FIG. 5 is a sectional view thereof.

A package 20 of a roll of a photosensitive material 21 is illustrated in FIGS. 3 through 5. In this package 20, the photosensitive material 21 is wound around the paper tube (core) 1, and the periphery of the photosensitive material 21 is wrapped by a light-shielding film 22. Both end portions of the light-shielding film 22 are turned toward the inside and inserted into both end openings of the paper tube 1. The package 20 is provided with a pair of end caps 23 at both end portions. The end cap 23 is, as shown in FIGS. 4 and 5, composed of a top wall portion 25, a circular recession recessed one step to catch the inner peripheral edge portion of the paper tube, and a bearing portion 24 projected from the center of the recession toward the recessing direction which is inserted into the paper tube from the end opening with pressure to fix the turned end portion of the light-shielding film 22. The end caps 23 were formed by the pulp molding by pressing a pulp slurry having a solid matter concentration of 1 to 3 wt. % containing 100 parts of crushed corrugated board, 2 parts of rosin sizing agent, 1 part of urea-formaldehyde wet paper reinforcing agent and 10 parts of phenol resin by a male mold and a female mold to be concentrated to about 4%, molding by the vacuum molding, and heating again to increase the strength of the molded article. The size of the end cap was a=140 mm, b=47 mm, c=15 mm, d=69.2 mm, e=100 mm and f=140 mm in FIGS. 4 and 5.

In the package 20 of a roll of a photosensitive material, the dimensional accuracy of the end cap 23 was high. The light-shielding film 22 was completely fixed between the paper tube 1 and the bearing portion 24 of the end cap 23, and moisture did not enter into the paper tube 1.

In the package of a roll of a photosensitive material shown in FIG. 3, the material of the end cap was varied, and moistureproofness and discarding ability were compared. The result are shown in Table 1.

TABLE 1

| End Cap Material | Moistureproofness | Discarding Ability |
|---|---|---|
| Pulp (pulp molding) | C | A |
| Plastic (Injection molding) | A | E |
| Polystyrene foam (Processed material) | A | E |
| Paper (Cylindrical body) | C | A |

Figure 6:
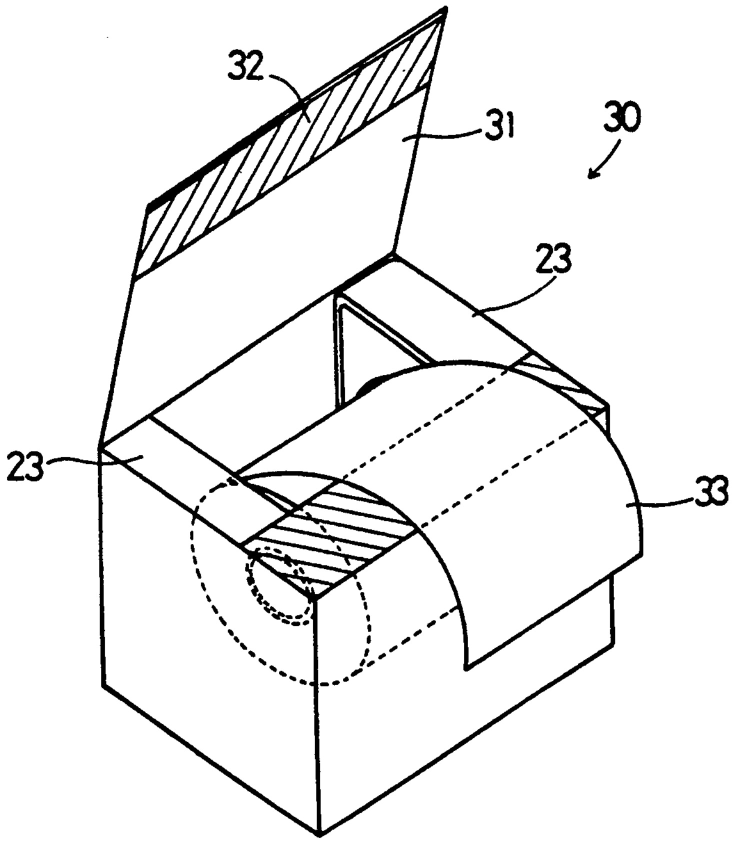
FIG. 6 is a perspective view partially unfolded of another package of a roll of a photosensitive material which also embodies the invention.
Figure 7:
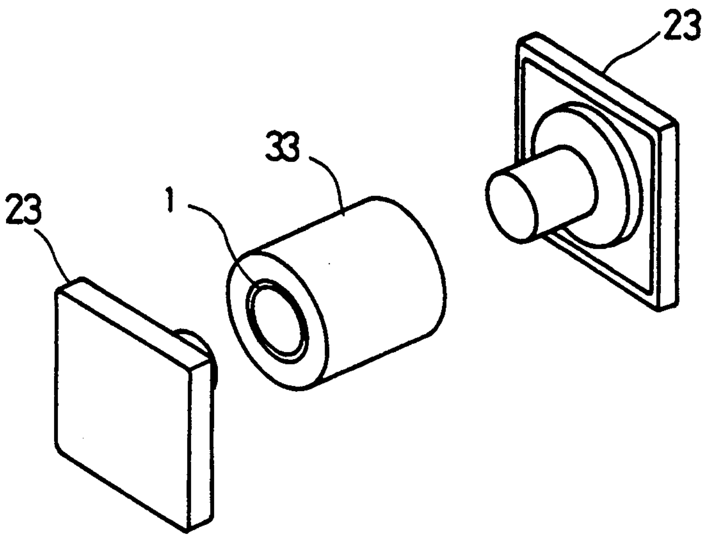
FIG. 7 is an unfolded perspective view of the roll of a photosensitive material and end cap members thereof.

A: Very excellent
C: Practical (Although properties did not entirely satisfy, within practical range)
E: Having a problem Another package 30 of a roll of a photosensitive material is illustrated in FIGS. 6 and 7. In this package 30, a light-shielding cloth 32 is attached to the slit for extending of a light-shielding box 31, and the light-shielding box 31 contains a photographic photosensitive material 33 wound around a paper tube 1 (core). The photographic photosensitive material 33 is rotatably supported by inserting a projection projected from a pair of an end cover member 23 into the paper tube 1, as shown in FIG. 7. The size of the end cover member was a=140 mm, b=40 mm, c=15 mm, d=75 mm, e=100 mm and f=140 mm.

The package 30 of a roll of a photosensitive material was simpler in its production than the package disclosed in Japanese Patent KOKAI No. 61-219040 using a bearing mechanism composed of support member and a cylindrical body formed of paper.

Figure 8:
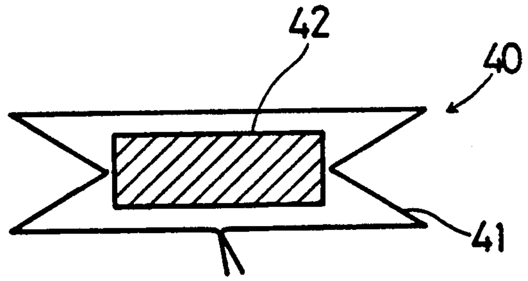
FIG. 8 is a sectional view of another package of a roll of a photosensitive material which also embodies the invention.
Figure 9:
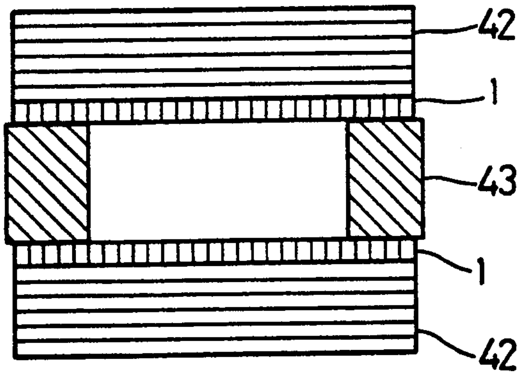
FIG. 9 is a sectional view of the roll of a photosensitive material part thereof.

Another package 40 of a roll of a photosensitive material is illustrated in FIGS. 8 and 9. In this package 40, a roll of color paper 42 is put in a gusset bag 41 formed of a laminated film composed of 70 g/m$^2$ unbleached kraft paper/15μm LDPE adhesive layer/15μm aluminum vacuum deposited (400Å) biaxially stretched nylon film/15μm LDPE adhesive layer/70μm light-shielding linear low density polyethylene film. As shown in FIG. 9, the color photographic printing paper 42 is wound around a paper tube 1, and a pair of caps 43 made of polyethylene resin are fitted to both end openings of the paper tube 1. The size of the paper tube 1 was 76.2 mm in inside diameter, 87.2 mm in outside diameter and 89 mm in width, and the size of the color paper was 89 mm×180 mm. In the package of a roll of a photosensitive material 40, the color photographic printing paper 42 wound around the paper tube 1 immediately after the formation, no fogging nor sensitivity deviation occurred.

The following tests were conducted for comparing properties of the paper tube for photosensitive materials.

Ten layers of a paper tape 0.5 mm in thickness having a moisture content of 7% and one layer of a surface paper tape 0.07 mm in thickness having a moisture content of 7% were formed into a spiral paper tube 76.2 mm in inside diameter, 5 mm in thickness, 1,000 mm in length shown in FIG. 1 by winding by the spiral winding machine shown in FIG. 2 using a different vinyl acetate emulsion adhesive at a tube-forming speed of 6 m/min. Each paper tube was cut in a length of 8.9 cm, and a color paper was wound facing the photographic emulsion layer on the outside. The roll was put in a light-shielding bag, and after storing at 40° C. for 10 days, the decrease of photographic sensitivity of the color paper was measured at the outer-most round and the innermost round to touch the paper tube.

The kind of adhesives used in Examples 1 and 2 and Comparative Examples 1 through 5 and the test result are summarized in Table 2, and the composition of each adhesive is shown in Table 3.

TABLE 2

| | Example | | Comparative | | | | |
|---|---|---|---|---|---|---|---|
| | 1 | 2 | 1 | 2 | 3 | 4 | 5 |
| Kind of Adhesive | A/B blend | A/B blend | A | B | B | B | C |
| PVA Saponification Degree | More than 98 mol. % | More than 98 mol. % | More than 98 mol. % | More than 98 mol. % | More than 98 mol. % | More than 98 mol. % | 95 to 98 mol. % |
| Adhesive Viscosity | 9000 | 6000 | 6000 | 18000 | 18000 | Adjusted to 6000 by water | 7000 |
| Adhesive Concentration | 54% | 50% | 45% | 55% | 55% | 54% | 50% |
| Coating Amount (g/m$^2$) | 25.0 | 25.0 | 25.0 | 25.0 | 35.0 | 25.0 | 25.0 |
| Moisture Content of Raw paper (%) | 7.0 | 7.0 | 7.0 | 7.0 | 7.0 | 7.0 | 7.0 |
| Moisture | 9.5 | 9.7 | 10.0 | Tube-forming | 10.3 | Tube-forming | Tube-forming |

TABLE 2-continued

| | Example | | Comparative | | | | |
|---|---|---|---|---|---|---|---|
| | 1 | 2 | 1 | 2 | 3 | 4 | 5 |
| Content of Paper Tube (%) | | | | impossible by rupture of raw paper | | impossible by rupture of raw paper | impossible by rupture of raw paper |
| Decrease of Photographic Sensitivity | within 0.02 | within 0.02 | 0.02 to 0.03 | — | 0.02 to 0.03 | — | — |

TABLE 3

| | Adhesive | | |
|---|---|---|---|
| | A | B | C |
| Concentration of Solid Matter | 45% | 55% | 50% |
| Vinyl Acetate Resin (parts) | 100 | 100 | 100 |
| PVA (parts) | 9 | 5 | 10 |
| (Saponification degree in mol. %) | (98.4) | (98.4) | (97.5) |
| Plasticizer (parts) | 20 | 22 | 25 |

From the above results, it was confirmed that, in Examples of this invention, the decrease of photographic sensitivity was very small. On the other hand, in Comparative Example 1 wherein the concentration of the adhesive was small and in comparative Example 3 wherein the coating amount was great, the moisture content of the paper tube was great, and the photographic sensitivity was remarkably decreased. In Comparative Example 2, the initial adhesive force was small due to the small coating amount by the high viscosity of the adhesive. As a result, an upper layer paper tape was separated from the under layer paper tape and cut by the driving belt, and paper tube could not be formed. In Comparative Example 4 wherein the viscosity of the adhesive was reduced by diluting a high concentration adhesive with water and in Comparative Example 5 wherein the saponification degree was lowered, although the coating ability was improved, the initial adhesive force was small and a paper tube could not be formed.

What is claims is :

1. A spirally wound paper tube formed from at least one paper tape, wherein the paper tape(s) is/are adhered together to form a spirally wound paper tube with a blend adhesive comprising at least two aqueous adhesives, said adhesives differing at least in concentration.

2. A paper tube according to claim 1, wherein the aqueous adhesives are members selected from the group consisting of vinyl acetate polymer emulsions, aqueous glue solutions and water glass.

3. The paper tube according to claim 1, wherein the aqueous adhesives are vinyl acetate emulsions.

4. The paper tube according to claim 3, wherein the blend adhesive further comprises a polyvinyl alcohol having a saponification degree of more than 98 mol. %.

5. The paper tube according to claim 4, wherein the blending amount of the polyvinyl alcohol is 2 to 20 wt. %.

6. A spirally wound paper tube according to claim 1, wherein the concentrations of the adhesives differ to an extent effective to provide a viscosity of the blend adhesive of 10,000 (mPa·s) measured at 20° C. by Brookfield viscometer.

7. A method of forming a paper tube according to claim 1, comprising spirally winding the paper tape(s) and adhering the tapers) with said blend adhesive.

8. A package of a roll of a photosensitive material comprising a roll of a photosensitive material wound around a paper tube according to claim 1, and a bearing means formed by pulp molding.

* * * * *